United States Patent [19]
Bathrick et al.

[11] Patent Number: 4,736,766
[45] Date of Patent: Apr. 12, 1988

[54] FLOW SHUT-OFF VALVE

[76] Inventors: Leeland M. Bathrick, 6820 New Hampshire Trail, Crystal Lake, Ill. 60012; Laddie F. Dobbs, 913 Madison, Wauconda, Ill. 60084

[21] Appl. No.: 28,876

[22] Filed: Mar. 24, 1987

[51] Int. Cl.[4] .................... F16K 43/00; B01D 35/04
[52] U.S. Cl. .................... 137/315; 137/329.02; 137/549; 210/432
[58] Field of Search .............. 137/329.01, 329.02, 137/329.03, 329.04, 549, 550, 315; 210/429, 431, 432

[56] References Cited

U.S. PATENT DOCUMENTS

| | | | |
|---|---|---|---|
| 485,055 | 10/1892 | Quinn | 137/329.02 |
| 735,039 | 7/1903 | O'Meara | 137/329.02 |
| 840,860 | 1/1907 | Müller | 137/549 |
| 1,204,106 | 11/1916 | Wing | 137/549 |
| 1,898,816 | 2/1933 | Crossen | 137/549 |
| 2,067,229 | 1/1937 | Birch | 137/329.01 |
| 3,115,154 | 12/1963 | Dillon | 137/549 |
| 3,286,979 | 11/1966 | Brown et al. | 137/549 |
| 3,960,358 | 6/1976 | Vollmer et al. | 137/549 |

FOREIGN PATENT DOCUMENTS

| | | | |
|---|---|---|---|
| 253340 | 11/1912 | Fed. Rep. of Germany | 137/549 |
| 2535902 | 2/1977 | Fed. Rep. of Germany | 137/549 |
| 202038 | 7/1938 | Switzerland | 137/549 |
| 611691 | 11/1948 | United Kingdom | 137/549 |

*Primary Examiner*—George L. Walton

[57] ABSTRACT

A fluid shut-off valve and a strainer assembly mounted in the same body with the strainer easily removable when the valve is in its closed position.

12 Claims, 3 Drawing Sheets

4,736,766

FLOW SHUT-OFF VALVE

RELATED APPLICATION

This application discloses subject matter contained in our copending U.S. application Ser. No. 028,875, filed 03/24/87, entitled NON-TURBULENT SHUT-OFF VALVE, filed the same day as the present application.

BACKGROUND OF THE INVENTION

Flow control and shut-off valves have been used in industrial processing systems such as industrial refrigeration systems for over the last century, and thousands of improvements have been made in these valves and in the overall processing system since then.

The regulating or flow control valve is usually a condition responsive valve that modulates flow through the system in response to either an external or internal condition, and one form of the latter is a metering valve that modulates flow in response to upstream pressure.

In these industrial processing systems, a manually operable shut-off valve is usually positioned upstream from the metering valve, and this valve, for example, may be a bonnet type valve where the bonnet is essentially the top closure plate on the valve into which a manually operable valve stem is threaded. A valve member carried by the end of this stem engages a stationary valve seat in a valve body when the valve is in its closed position completely blocking flow through the valve. When the valve stem is unthreaded, the valve member moves away from the seat permitting flow through the shut-off valve to the regulating valve, and the shut-off valve is usually positioned in either its fully closed or fully opened position.

A strainer assembly is usually required in the flow line between the shut-off valve and the metering valve to minimize the passing of any foreign material into the metering valve and downstream into the other processing equipment associated with the system, such as refrigeration components. Heretofore, the strainer required a separate strainer body that included an inlet flange, an outlet flange, partitioned walls for the strainer seat, and a bottom cap removably attached to the strainer body by fasteners that permits the removal of the strainer for cleaning or replacement. This requirement for a strainer body and bottom cap significantly added to the cost of the processing system bearing in mind that the valves, flow lines, flow capacity, and therefore also the size of the components in these industrial processing systems are quite large. The strainer body is a metal sand casting that requires machining the inlet and outlet flanges, the strainer seats in the partition wall and the bottom plate as well as the strainer opening for the bottom plate and the bottom plate flange, all making the strainer assembly quite costly.

The shut-off valve assembly, while required to interrupt flow through the system when desired, is a major contributor to turbulent fluid flow in the system which decreases system efficiency. One reason for this is that the valve member carried by the valve stem remains in the flow stream even when in its open position.

It is a primary object of the present invention to ameliorate the problems noted above in shut-off valve assemblies.

SUMMARY OF THE PRESENT INVENTION

In accordance with the present invention a combined shut-off valve and strainer assembly is provided wherein the strainer, instead of being mounted in a separate strainer body, is mounted directly in an outlet section of the valve body with access being provided by a bottom plate for the valve body. In this way, not only is the requirement for a separate strainer body eliminated, but also the requirement for the strainer body bottom plate, thereby eliminating two castings and multiple machining operations heretofore thought necessary in these industrial flow control systems.

The valve body has axially aligned horizontal inlet and outlet flanges with an integral partition wall having a circular opening with a frustoconical valve seat that separates the valve body into an inlet section and an outlet section. A valve member is carried by a valve stem threadedly engaging a bonnet covering an upper central opening in the valve body. The valve member is reciprocal in the inlet section of the valve body. This same partition has an annular seat that locates the upper end of an annular strainer mounted in the outlet section of the valve body coaxially aligned with the valve stem, which as noted above, is reciprocal in the inlet section of the valve body. The lower end of the strainer is seated in an annular seat in the valve bottom plate.

The location of the strainer in the outlet section of the valve body has two significant advantages. Firstly, its location in the outlet section puts it in its most favorable location for effective straining since flow passes initially inside the annular strainer providing more effective straining capacity while minimizing disturbance to flow. Secondly, the strainer in this location permits the valve member to be moved to its closed position and the bottom plate removed for strainer cleaning or replacement without requiring any secondary flow shut-off mechanism frequently required in present day flow processing control systems. That is, in the present invention the shut-off valve itself isolates the outlet section of the shut-off valve from upstream flow permitting the outlet section to be exposed without loss of upstream pressure when the bottom plate is removed for strainer access.

Other objects and advantages of the present invention will appear from the detailed description below.

DETAILED DESCRIPTION OF THE PREFERRED EMBODIMENT

Figure 1:
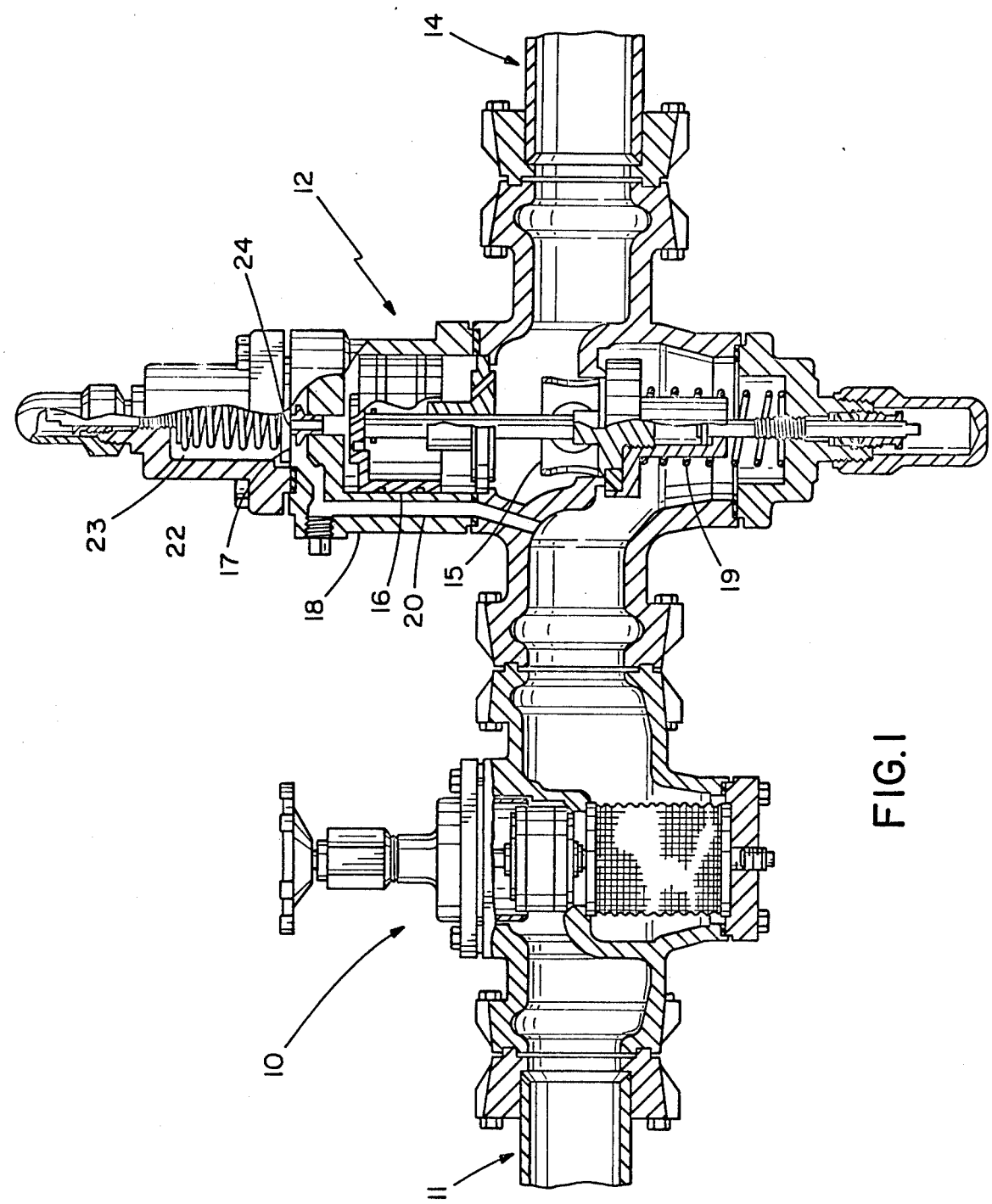
FIG. 1 is a partial longitudinal section illustrating the present shut-off valve with integral strainer connected in series with a conventional metering valve positioned upstream from the metering valve.

Referring to the drawings, and particularly FIG. 1, a shut-off valve assembly 10, according to the present invention, is shown with its inlet connected to an inlet pipe 11 and its outlet connected to deliver fluid to a regulating valve assembly 12 that meters flow from the shut-off valve 10 to an outlet pipe 14 connected to deliver fluid under pressure to an industrial processing components such as in a refrigeration system.

The regulating valve assembly 12 forms no part of the present invention and is illustrated to show the function of the shut-off valve assembly 10 in an exemplary industrial processing system. Valve 12 includes a metering valve member 15 biased toward its minimum flow position by spring 19 and it is positioned by a piston 16 driven by fluid pressure in an upper chamber 17 in cylinder 18 that reacts against a diaphram 22 biased by an adjustable spring assembly 23, chamber 17 communicates with upstream pressure through passage 20, and when fluid pressure in chamber 17 overcomes the force of spring assembly 23 on diaphram 22, it moves upwardly opening pilot port 24 and permitting flow through the port to the top side of piston 16, moving piston 16 downwardly against the biasing force of spring 19 to a balanced position.

Figure 2:
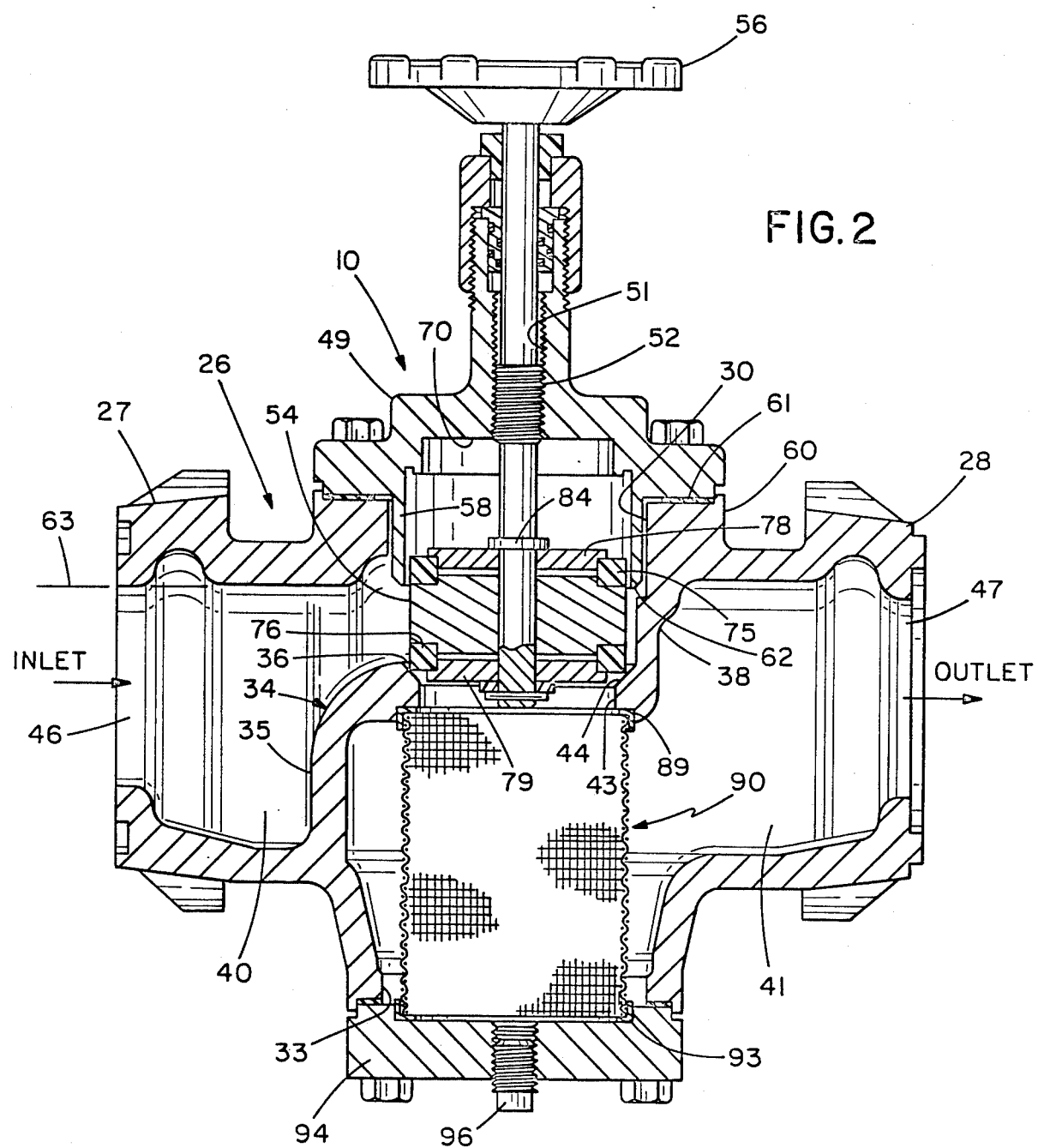
FIG. 2 is an enlarged longitudinal section of the shut-off valve with integral strainer illustrated in FIG. 1, in its closed position.
Figure 3:
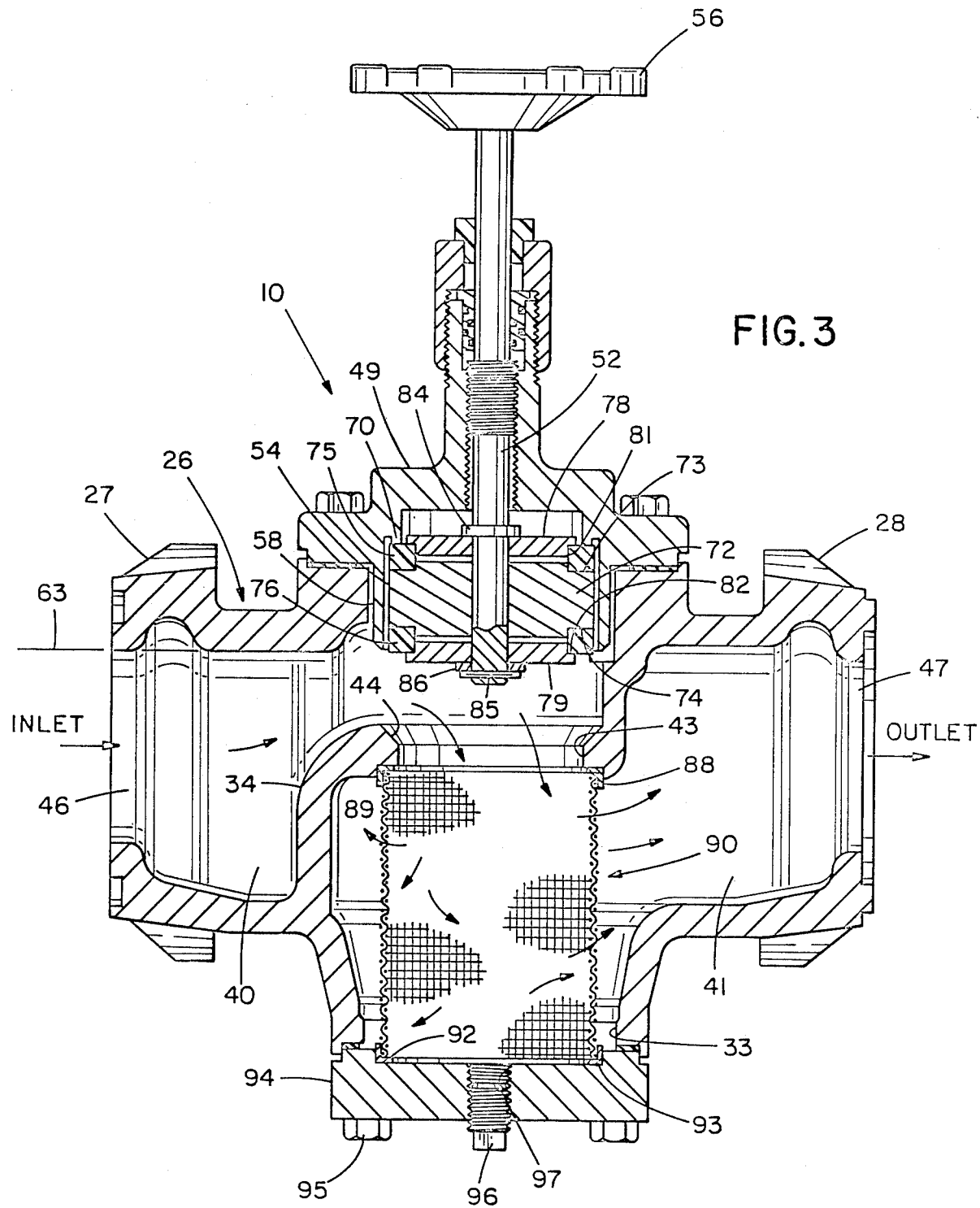
FIG. 3 is an enlarged longitudinal section of the shut-off valve with integral strainer illustrated in FIG. 1, in its opened position.

As seen more clearly in FIGS. 2 and 3, the shut-off valve assembly 10 includes a sand cast valve body 26 having an inlet flange 27, an outlet flange 28, a central bonnet opening 30, a lower annular bottom plate opening 33, and a generally S-shaped partition wall 34 having a vertical portion 35, a horizontal portion 36, and another vertical portion 38.

The partition wall 34 separates the valve body into an inlet section 40 and an outlet section 41 connected only by a circular opening 43 in partition wall portion 36. Opening 43 includes a frustoconical valve seating surface 44.

The inlet flange 27 has an inlet opening 46 coaxially aligned with outlet flange 28 and outlet opening 47.

The central upper bonnet opening 30 in the valve body 26 is closed by a stepped annular bonnet 49 that has a lower threaded opening 51 threadedly receiving a valve stem 52 that carries a valve member assembly 54 on its lower end. Valve stem 52 is externally rotated by hand wheel 56 rotatably fixed to the upper end of the valve stem 52.

The bonnet 49 has an integral annular flange 58 that forms a shroud for the valve member assembly 54 when in its open position illustrated in FIG. 3. Upper annular flange 60 on valve body 26 and bonnet mounting surface 61 on its upper surface are positioned so that lower surface 62 of the shroud 58 lies above the uppermost flow line 63 of the inlet section 40. This permits the valve member assembly 54 to be completely withdrawn from the flow stream in its open position illustrated in FIG. 3.

Furthermore, the shroud 58 isolates the rear side of the valve member assembly 54 from dynamic fluid pressure in all open positions of the valve. The bonnet 49 is provided with an annular projection 70 that forms a stop for the valve member assembly 54 in its open position illustrated in Fig. 3, and it also functions to seal the rear surface of the valve member assembly 54 from static pressure.

The valve member assembly 54 includes a cylindrical valve member body 72 with annular recesses 73 and 74 at each end thereof that receive elastomeric annular seats 75 and 76, both of which are identical and have square cross-sections. Seat 76 is the forward seat engageable with partition seat 44 in the closed position of the valve member illustrated in FIG. 2, and seat 75 is the rear seat engageable with stop 70 when the valve member is in its open position illustrated in FIG. 3.

The valve seats 75 and 76 are held against valve member body 72 by identical seat plates 78 and 79 with annular recesses 81 and 82 that receive the annular seats 75 and 76 respectively.

The valve member asesmbly 54 is held axially against an integral flange 84 on valve stem 52 by a roll pin 85 that extends through a hole in the bottom of the valve stem 52 and reacts against a washer 86 that engages the seat plate 79.

The entire valve member assembly 54 is reversible on the stem 52 by removing roll pin 85, sliding the valve assembly 54 off the valve stem and reversing and replacing it on the valve stem. This switches the annular seat 75 from the rear stop seat to the forward valve seat which, of course, is done when the original valve seat 76 becomes worn. Note that annular stop 70 engages the upper flat surface of the rear seat 75 so that any wear caused by the stop does not affect the performance of this seat when it is switched to the forward position because the forward seat engages the frustoconical partition seat 44 at the corner of the valve seat.

Each of the valve seats 75 and 76 is reversible itself in valve assembly 54 by removing the valve assembly 54 from the stem, separating the seat plates 78 and 79 from the seats 75 and 76, and then flipping the seats. This, of course, exposes unworn surfaces on the valve seats 75 and 76 to further extend seat life.

The partition wall 34 has a counterbore 88 that receives and locates an annular ring 89 on the upper end of a strainer 90 positioned in outlet section 41 of the valve body 26. The lower end of strainer 90 has a ring 92 received and located in a counterbore 93 in bottom plate 94 that closes bottom plate opening 33 and is fastened to the valve body by fasteners 95. Bottom plate 94 has a plug 96 threaded in a central bore 97 therein that provides access to the interior of the strainer assembly 90 if desired. Plug 96 can be used as a drain plug.

The strainer assembly 90 can be removed for cleaning and replacement simply by removing bottom plate 94 with the valve member 54 in its closed position. Note that the valve member 54 is in the inlet section 40 while the strainer assembly 90 is in outlet section 41. With valve member 94 closed, the outlet section 41 is isolated from system pressure permitting the plate 94 to be removed without exposure to system pressure. The positioning of the strainer assembly 90 in the outlet section 41 surrounding the partition opening 43 and in axial alignment with valve member 54 permits fluid flow into the strainer internally and in an axial direction maximizing strainer effectiveness.

What is claimed is:

1. An industrial fluid flow shut-off valve assembly, comprising: a valve body having a partition wall with a generally annular seat therein separating the interior of the valve body into an inlet section and an outlet section, an inlet having an upper horizontal surface in the valve body continuously communicating with the inlet section in the valve body, an outlet in the valve body in continuous communication with the outlet section in the valve body, an externally operable shut-off valve member linearly reciprocal only in the inlet section of the valve body movable from an open position in the inlet section space substantially from the valve seat permitting unobstructed fluid flow from the inlet section to the outlet section to a closed position in the inlet section blocking flow from the inlet section to the outlet section, a fluid flow strainer completely in the outlet section of the valve body, means in the outlet section of the valve body permitting removal of the strainer from the outlet section while the valve member is in its closed position with high pressure in the inlet section tending to close the valve member and a low profile bonnet covering the inlet section of the valve body having an integral annular unthreaded shroud projecting directly into the inlet flow path just above the valve seat at least to the upper horizontal surface of the valve body inlet, said valve member having a seal element engageable with the valve seat, said shroud having a sufficient length so the valve member is withdrawn sufficiently in the open position into the shroud so the seal element is at least substantially coplanar with the end of the shroud, to provide a reduced height bonnet when the bonnet is attached to the valve body so it may be utilized in tight or close areas.

2. An industrial fluid flow shut-off valve assembly, as defined in claim 1, wherein the means permitting removal of the strainer is a bottom cap on the valve body covering an opening in the valve body to the outlet section.

3. An industrial fluid flow shut-off valve assembly, as defined in claim 2, wherein the bottom cap has an integral seat for locating one end of the strainer.

4. An industrial fluid flow shut-off valve assembly, as defined in claim 2, wherein the bottom cap is axially aligned with the annular valve seat in the partition wall.

5. An industrial fluid flow shut-off valve assembly, as defined in claim 1, wherein the partition wall has a secondary seat for locating one end of the strainer on the opposite side of the partition wall from the valve seat therein.

6. An industrial fluid flow shut-off valve assembly, as defined in claim 1, wherein the inlet and outlet in the valve body are generally aligned on one axis, said strainer being generally annular in configuration, said valve member being reciprocal on another axis generally perpendicular to said one axis, said valve seat and strainer being generally aligned on said other axis.

7. An industrial fluid flow shut-off valve assembly comprising: a valve body having a partition wall with a generally annular seat therein separating the interior of the valve body into an inlet section and an outlet section, an inlet having an upper horizontal surface in the valve body continuously communicating with the inlet section in the valve body, an outlet in the valve body in continuous communication with the outlet section in the valve body, an externally operable shut-off valve member linearly reciprocal only in the inlet section of the valve body moveable from an open position in the inlet section spaced substantially from the valve seat permitting unobstructed fluid flow from the inlet section to the outlet section to a closed position in the inlet section blocking flow from the inlet section to the outlet section, a fluid flow strainer completely in the outlet section of the valve body, a bottom plate on the valve body removably closing an opening in the valve body adjacent the strainer so the strainer may be removed with the valve member in its closed position with high pressure in the inlet section tending to close the valve member, and a low profile bonnet covering the inlet section of the valve body having an integral annular unthreaded shroud projecting directly into the inlet flow path just above the valve seat at least to the upper horizontal surface of the valve body inlet, said valve member having a seal element engageable with the valve seat, said shroud having a sufficient length so the valve member is withdrawn sufficiently in the open position into the shroud so the seal element is at least substantially coplanar with the end of the shroud, to provide a reduced height bonnet when the bonnet is attached to the valve body so it may be utilized in tight or close areas.

8. An industrial fluid flow shut-off valve assembly, as defined in claim 7, wherein the bottom plate has an integral seat for locating one end of the strainer.

9. An industrial fluid flow shut-off valve assembly, as defined in claim 7, wherein the bottom plate is axially aligned with the annular valve seat in the partition wall.

10. An industrial fluid flow shut-off valve assembly, as defined in claim 7, wherein the partition wall has a secondary seat for locating one end of the strainer on the opposite side of the partition wall from the valve seat therein.

11. An industrial fluid flow shut-off valve assembly, as defined in claim 7, wherein the inlet and outlet in the valve body are generally aligned on one axis, said strainer being generally annular in configuration, said valve member being reciprocal on another axis generally perpendicular to said one axis.

12. An industrial fluid flow shut-off valve assembly, comprising: a valve body having a partition wall with a generally annular seat therein separating the interior of the valve body into an inlet section and an outlet section, an inlet having an upper horizontal surface in the valve body continuously communicating with the inlet section in the valve body, an outlet in the valve body in continuous communication with the outlet section in the valve body, an externally operable shut-off valve member linearly reciprocal only in the inlet section of the valve body movable from an open position in the inlet section spaced substantially from the valve seat permitting unobstructed fluid flow from the inlet section to the outlet section to a closed position in the inlet section blocking flow from the inlet section to the outlet section of the valve body, a fluid flow strainer completely in the outlet section of the valve body, said strainer being generally annular in configuration, said partition wall having an annular strainer seat on the side of the partition wall opposite the valve seat for locating one end of the strainer, a bottom plate removably closing an opening in the valve body, said bottom plate having an annular seat for locating the other end of the strainer facilitating the removal of the strainer when the valve member is in its closed position with high pressure in the inlet section tending to close the valve member, and a low profile bonnet covering the inlet section of the valve body having an integral annular unthreaded shroud projecting directly into the inlet flow path just above the valve seat at least to the upper horizontal surface of the valve body inlet, said valve member having a seal element engageable with the valve seat, said shroud having a sufficient length so the valve member is withdrawn sufficiently in the open position into the shroud so the seal element is at least substantially coplanar with the end of the shroud, to provide a reduced height bonnet when the bonnet is attached to the valve body so it may be utilized in tight or close areas.

* * * * *